Patented May 7, 1935

2,000,329

UNITED STATES PATENT OFFICE 2,000,329

PROCESS OF PREPARING ALKALI METAL ALCOHOLATES

Paul Heisel and Eduard Bergheimer, Gersthofen, near Augsburg, Germany, assignors to I. G. Farbenindustrie Aktiengesellschaft, Frankfort-on-the-Main, Germany No Drawing. Application September 1, 1933, Serial No. 687,908. In Germany September 27, 1932

10 Claims. (Cl. 260—156)

The present invention relates to a process of preparing alkali metal alcoholates.

Alkali metal alcoholates have hitherto been prepared by causing alkali metals to act upon alcohols. It is only with considerable precautions that this process can be conducted on a manufacturing scale owing to the difficulty and danger associated with the use of alkali metals. It has been proposed to use the hydroxides instead of the metals and to cause them to react with the alcohols in the presence of auxiliary liquids which serve to remove from the reaction vessel the water liberated by the reaction.

We have now found that alkali metal alcoholates can be prepared in a simple and economical manner by causing alkali amalgams, for instance an alkali amalgam having a content of alkali of about 0.3 per cent. (i. e. a still liquid alkali amalgam) to react with the vapor of the alcohol. The reaction is preferably carried out by causing the alkali amalgam to flow downwardly through a column in countercurrent to alcohol vapors ascending continuously in the column. In this manner there can be produced an alcoholate solution of any desired concentration which yields the solid alcoholate after distillation of the alcohol. The alkali metal alcoholate obtained is free from hydroxide.

Our invention involves the advantage over the hitherto known processes that the alkali metals need not be isolated from the amalgams obtained directly in the electrolytic decomposition of the alkali metal salts and that the use of auxiliary liquids can be dispensed with.

The reaction can be conducted in a simple apparatus which comprises a still for evaporating the alcohol. The alcohol vapor rises in a column filled with rings and arranged above the still, in a counter current to the amalgam introduced at the upper end of the column; the alcoholate is formed in the column by reaction between the amalgam and the alcohol vapor. Above the column there is mounted a reflux condenser. A solution of the alcoholate in the excess of alcohol flows back into the still wherein it continuously becomes enriched. The mercury which has been completely freed from alkali metal is drawn off at the bottom of the column; and may be returned to the electrolytic cell. The process of preparing alcoholate may be conducted intermittently or continuously.

As alcohols there may be used every alcohol which boils without decomposition, if desired, under a reduced pressure, and does not chemically react in any other manner with alkali metals. Aliphatic alcohols, such as methyl alcohol, ethyl alcohol, butyl alcohol, octyl alcohol, may be used as well as cycloaliphatic alcohols, such as cyclohexanol, methylcyclohexanol or aliphatic aromatic alcohols, such as benzyl alcohol.

The following examples serve to illustrate the invention, but they are not intended to limit it thereto:

(1) Methanol is heated to boiling in a still provided with a column and a reflux condenser. The methanol vapor rises up through the column filled with rings into the reflux condenser in a counter current to sodium amalgam flowing downwardly through the column. The mercury free from alkali metal leaves the lower end of the column and may be used again for the electrolytic decomposition of the alkali metal salts, the methyl alcoholic solution of sodium methylate runs back into the still. The process is interrupted as soon as the desired methylate concentration is obtained. This alcoholate solution may be evaporated to dryness, solid alcoholate which is free from alcohol being thus obtained in known manner.

(2) In the apparatus used in example 1 octyl alcohol is heated to boiling at about 100° C. under reduced pressure. The process is otherwise the same as described in Example 1. An octyl alcoholic solution of sodium octylate is obtained. In this case, too, the solid alcoholate can be obtained by evaporating the alcohol.

(3) Ethyl alcohol is heated to boiling in the still. The ethanol vapor rises up in a counter current to potassium amalgam in a manner similar to that described in Example 1. The further procedure is as described in Example 1.

(4) Benzyl alcohol is heated to boiling at about 100° C. under reduced pressure. The vapor rises up in the column in a counter current to sodium amalgam. There is otherwise worked as described in Example 1, the sodium compound of the benzyl alcohol being obtained.

(5) Cyclohexanol is passed heated to boiling, if desired under reduced pressure. The vapor is in a counter current to potassium amalgam, as described in the preceding examples. There is obtained potassium cyclohexylate.

We claim:

1. The process which comprises causing a vaporous alcohol to act upon a liquid amalgam of an alkali metal.

2. The process which comprises causing vaporous ethyl alcohol to act upon a liquid amalgam of an alkali metal.

3. The process which comprises causing vaporous methyl alcohol to act upon a liquid amalgam of an alkali metal.

4. The process which comprises causing a liquid amalgam of an alkali metal to react upon a vaporous alcohol in a counter current manner.

5. The process which comprises causing a liquid amalgam of an alkali metal to react upon vaporous methyl alcohol in a counter current manner.

6. The process which comprises causing a liquid amalgam of an alkali metal to react upon vaporous ethyl alcohol in a counter current manner.

7. The process which comprises causing a vaporous alcohol to act upon liquid sodium amalgam.

8. The process which comprises causing a vaporous alcohol to act upon liquid potassium amalgam.

9. The process which comprises causing a vaporous alcohol to act upon a liquid alkali amalgam.

10. The process which comprises causing a liquid alkali amalgam to trickle down over a column provided with filling materials and causing vaporous alcohol to rise up and to condense in the said column.

PAUL HEISEL.
EDUARD BERGHEIMER.